United States Patent
Schilling

(10) Patent No.: US 10,829,246 B2
(45) Date of Patent: Nov. 10, 2020

(54) AIRCRAFT TRANSMISSION TEST FIXTURE AND SYSTEM

(71) Applicant: The Boeing Company, Chicago, IL (US)

(72) Inventor: Kenneth P. Schilling, West Chester, PA (US)

(73) Assignee: The Boeing Company, Chicago, IL (US)

(*) Notice: Subject to any disclaimer, the term of this patent is extended or adjusted under 35 U.S.C. 154(b) by 177 days.

(21) Appl. No.: 16/186,774

(22) Filed: Nov. 12, 2018

(65) Prior Publication Data
US 2020/0148394 A1    May 14, 2020

(51) Int. Cl.
*G01M 13/025* (2019.01)
*B64F 5/60* (2017.01)

(52) U.S. Cl.
CPC ............. *B64F 5/60* (2017.01); *G01M 13/025* (2013.01)

(58) Field of Classification Search
CPC ............. G01M 13/025; G01M 13/026; G01M 13/027; B64F 5/60
USPC ............... 73/115.02, 116.01, 116.02, 116.03, 73/116.04, 118.03
See application file for complete search history.

(56) References Cited

U.S. PATENT DOCUMENTS

| | | | |
|---|---|---|---|
| 4,788,855 A * | 12/1988 | Laskody | G01L 5/133 73/112.04 |
| 5,693,896 A * | 12/1997 | Mistral | G01L 5/133 73/178 H |
| 6,378,387 B1 * | 4/2002 | Froom | G01M 5/0016 73/865.8 |
| 6,393,904 B1 * | 5/2002 | Krug | G01M 13/02 73/115.02 |
| 10,053,238 B1 * | 8/2018 | Schilling | G01M 5/0075 |
| 2006/0101921 A1 * | 5/2006 | Ostgaard | G01N 3/04 73/804 |
| 2009/0133381 A1 * | 5/2009 | Holmes | G06F 30/15 60/204 |
| 2012/0046141 A1 * | 2/2012 | Blankenship | G01M 13/022 475/269 |
| 2018/0038766 A1 * | 2/2018 | Knestel | G01M 9/062 |
| 2018/0156689 A1 * | 6/2018 | McGranahan | G01M 7/025 |

* cited by examiner

*Primary Examiner* — Eric S. McCall
(74) *Attorney, Agent, or Firm* — McDonnell Boehnen Hulbert & Berghoff LLP

(57) ABSTRACT

An example test fixture includes a lower frame having a first rocker rail and a second rocker rail coupled to the first rocker rail, wherein each of the first rocker rail and the second rocker rail has a respective curved surface that allows the lower frame to tilt about a first axis; a rotatable base coupled to the lower frame; an upper frame having a mounting system configured to couple a transmission of an aircraft to the upper frame; a support frame that couples the upper frame to the rotatable base; and a rotary actuator configured to rotate the rotatable base, the support frame, and the upper frame about a second axis perpendicular to the first axis.

20 Claims, 12 Drawing Sheets

AIRCRAFT TRANSMISSION TEST FIXTURE AND SYSTEM

FIELD

The present disclosure relates generally to a test fixture and a testing system for aircraft transmissions. More particularly the present disclosure relates to a test fixture and test system used to test a lubrication system of aircraft transmissions at various transmission orientations.

BACKGROUND

Lubricating oil is a class of oils used to reduce friction, heat, and wear between mechanical components that are in contact with each other. Lubricating oil is used in motorized vehicles (automobiles, aircraft, etc.), where it is known as motor oil when used within engines or transmission fluid when used in transmissions. Proper lubrication of moving parts is essential for the operation of a transmission or engine. The lubrication primarily decreases the power required to overcome friction and reduces wear between the rubbings and bearing surfaces, thereby increasing the power output and the transmission service life, and avoiding seizure and damage of the components. Additionally the lubricant acts as a coolant carrying heat away from the bearings, gears, etc.

The effectiveness of lubrication plays an important role in determining the service life and the performance characteristics of a transmission. Lubrication between two moving surfaces results from oil film that builds up to separate the surface and support the load. The lubrication system should provide a continuous flow of oil to lubricated surfaces so that the oil film on each component is maintained to minimize wear.

Transmissions used in aircraft are subjected to various operating conditions during flight. For example, the aircraft can perform various pitching, rolling, or a combination of pitching and rolling maneuvers during flight. It may be desirable to test the lubrication system of a transmission to ensure that lubrication is effective during such various maneuvers at various transmission orientations.

It may thus be desirable to have a test fixture and test system that enable testing performance of a lubrication system of an aircraft transmission at different orientations. It may also be desirable for the test fixture and test system to accommodate different transmission sizes and also enable testing the lubrication system dynamically as the orientation of the transmission changes to simulate dynamic operating conditions of an aircraft. It is with respect to these and other considerations that the disclosure made herein is presented.

SUMMARY

The present disclosure describes examples that relate to an aircraft transmission test fixture and system.

In one aspect, the present disclosure describes a test fixture. The test fixture includes: (i) a lower frame having a first rocker rail and a second rocker rail coupled to the first rocker rail, wherein each of the first rocker rail and the second rocker rail has a respective curved surface that allows the lower frame to tilt about a first axis; (ii) a rotatable base coupled to the lower frame; (iii) an upper frame having a mounting system configured to couple a transmission of an aircraft to the upper frame; (iv) a support frame that couples the upper frame to the rotatable base; and (v) a rotary actuator configured to rotate the rotatable base, the support frame, and the upper frame about a second axis perpendicular to the first axis.

In another aspect, the present disclosure describes a testing system. The testing system includes: (i) a test fixture having: (a) a lower frame having a first rocker rail and a second rocker rail coupled to the first rocker rail, wherein each of the first rocker rail and the second rocker rail has a respective curved surface that allows the lower frame to tilt about a first axis, (b) a rotatable base coupled to the lower frame, (c) an upper frame having a mounting system configured to couple a transmission of an aircraft to the upper frame, (d) a support frame that couples the upper frame to the rotatable base, and (e) a rotary actuator configured to rotate the rotatable base, the support frame, and the upper frame about a second axis perpendicular to the first axis; (ii) a clamping ring coupled to the upper frame and configured to be coupled to the transmission; and (iii) a pitching actuator coupled to the clamping ring, wherein actuation of the pitching actuator causes the clamping ring and the upper frame to tilt about the first axis, such that when the transmission is mounted to the clamping ring and the upper frame, actuation of the pitching actuator causes the transmission to be disposed at a particular pitch angle relative to the first axis.

In still another aspect, the present disclosure describes a method. The method includes: (i) mounting a transmission of an aircraft to a test fixture, wherein the test fixture comprises: (a) a lower frame having a first rocker rail and a second rocker rail coupled to the first rocker rail, wherein each of the first rocker rail and the second rocker rail has a respective curved surface that allows the lower frame to tilt about a first axis, (b) a rotatable base coupled to the lower frame, (c) an upper frame having a mounting system configured to couple the transmission to the upper frame, (d) a support frame that couples the upper frame to the rotatable base, and (e) a rotary actuator configured to rotate the rotatable base, the support frame, and the upper frame about a second axis perpendicular to the first axis; (ii) driving the transmission at a first speed for a first period of time while recording temperature and pressure of lubrication fluid circulating through the transmission; (iii) actuating a pitching actuator coupled to the transmission to tilt the transmission about the first axis; (iv) after actuating the pitching actuator, driving the transmission at a second speed for a second period of time while recording temperature and pressure of lubrication fluid circulating through the transmission; (v) actuating the rotary actuator to rotate the transmission about the second axis; (vi) after actuating the rotary actuator, actuating the pitching actuator coupled to the transmission to tilt the transmission about the first axis; and (vii) after actuating the rotary actuator and the pitching actuator, driving the transmission at a third speed for a third period of time while recording temperature and pressure of lubrication fluid circulating through the transmission.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
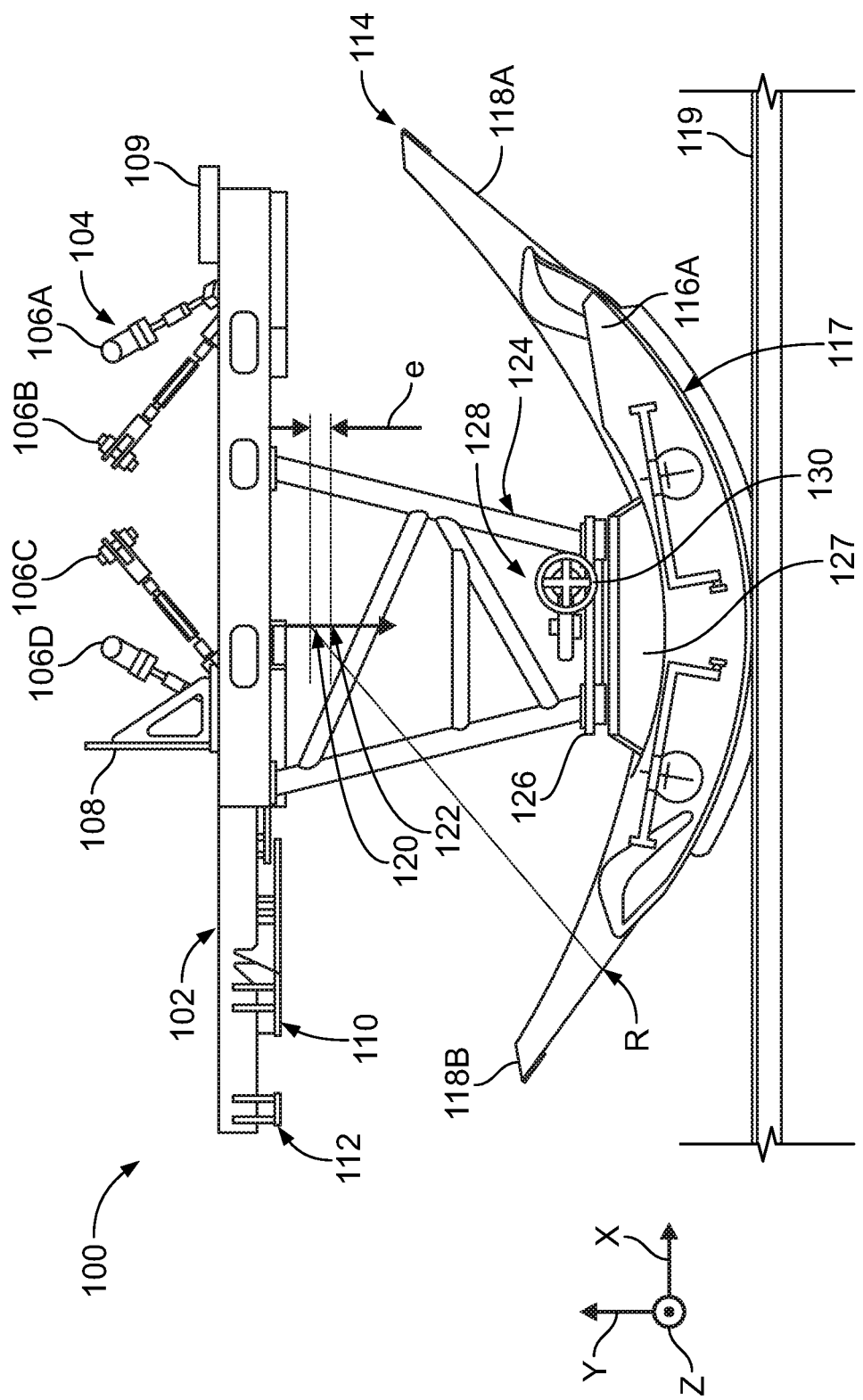
FIG. 1 illustrates a test fixture for testing a transmission, in accordance with an example implementation.

An aircraft in flight is free to rotate in three dimensions: (i) yaw, which comprises nose movement left or right about an axis running up and down; (ii) roll, which comprises rotation about an axis running from nose to tail of the aircraft; and (iii) pitch, which comprises nose movement up or down about an axis running from wing to wing (e.g., an axis perpendicular to the roll axis). A transmission of an aircraft operates at different orientations as a result of the aircraft performing pitching, rolling, and combinations of pitching and rolling rotations during flight. In some examples, the aircraft (e.g., a military helicopter) can perform or be expected to perform extreme rotations during flight. The term "aircraft" is used herein to encompass any type of aircraft, fixed wing aircraft or rotorcraft.

Lubrication systems of aircraft transmissions are expected to be subjected to such aircraft rotations, while providing a continuous flow of fluid (i.e., lubrication oil) to all lubricated surfaces so that fluid film on each component is maintained to minimize wear. It may thus be desirable to test the lubrication system of a transmission under various transmission orientations that correspond to expected aircraft rotations to ensure that fluid temperatures and pressures do not deviate from safe threshold temperatures and pressures during operation of the aircraft.

In an example, the transmission can be placed in a frame in a particular orientation then operated at the particular rotations while recording fluid temperature and pressure. When it is desired to test the transmission at a different orientation (e.g., pure pitch by a particular angle, pure roll by a particular angle, or a combination of roll and pitch), the test is stopped, and then a crane can be used to move the transmission and re-orient it to a particular desired attitude or orientation before restarting the test and recording data at the new orientation. However, in this example, dynamic data is not recorded during movement of the transmission from one orientation to another. Further, completing the test at numerous orientations that cover the various orientations at which the transmission is expected to operate may take a long time as the test is stopped between different orientations and a crane is used to re-orient the transmission.

In another example, a double-gimbaled fixture can be used. A gimbal is a pivoted support that allows the rotation of an object about a single axis. A set of two gimbals, one mounted on the other with orthogonal pivot axes, may be used to allow the transmission to be rotated about two perpendicular axes independently. Particularly, a fixture can include a first frame (e.g., inner gimbal) configured to rotate about a first axis. The fixture can further include a second frame (e.g., an outer gimbal) configured to rotate about a second axis perpendicular to the first axis. A third frame can be used to mount the double-gimbaled fixture having the two frames to a fixed structure (e.g., the floor). The transmission can be mounted to the double-gimbaled fixture and various orientations of the transmission can be achieved via rotating either or both of the first and second frames.

This double-gimbaled fixture example configuration, however, can be limiting as to the size of the transmission to be used. It may be desirable to mount and test other equipment, such as pumps, cooler, fans, clutches, etc., in addition to the transmission. Mounting a large transmission (e.g., a transmission weighing more than 3000 pounds) in addition to other equipment or components of the lubrication system to an inner frame of the double-gimbaled fixture can make the fixture large and difficult to handle and operate.

It may thus be desirable to have a test fixture that allows mounting different size transmissions, including large transmissions, in addition to supporting equipment, while allowing the transmission to be tested at various orientations. It may also be desirable for the test fixture to be configured to facilitate changing the orientation of the transmission quickly so as to allow performing many tests (e.g., 6-12 tests a day) at various orientations. It may also be desirable to facilitate recording data associated with the lubrication system (e.g., fluid temperatures and pressures) dynamically as the orientation of the transmission is changed.

FIG. 1 illustrates a test fixture 100 for testing a transmission, in accordance with an example implementation. The test fixture 100 includes an upper frame 102. The upper frame 102 can be configured to include a plurality of beams or tubes (e.g., square tubes, I-beams, etc.) coupled together to form a platform.

The transmission to be tested in addition to its supporting equipment can be mounted to the upper frame 102 of the test fixture 100. Transmissions of aircraft can have different mounting patterns or configurations based on a type of the transmission and type of the aircraft. For instance, fixed wing aircraft can have transmission with a mounting configuration that is different than a respective mounting configuration of a transmission of a rotor craft. One transmission of a particular aircraft can have a 3-point mounting system, i.e., the transmission can be supported at three points within the aircraft. Another transmission of another type of aircraft can have a 15-point mounting system, i.e., the transmission can be supported at fifteen points within the aircraft. In an example, the mounts (e.g., the 3-point or 15-point mounts) can include elastic bearing units or mounting struts so as to suppress or accommodate any vibration during operation. In other examples, the transmission can be fastened or bolted to a frame within the aircraft. Some transmissions can be mounted vertically, whereas others can be mounted horizontally.

Regardless of the type of transmission or the type of aircraft, the upper frame 102 is configured to accommodate or duplicate various mounting configurations of various transmissions transmission so as to enable mounting any type of transmission thereto. For example, the upper frame 102 can have a mounting system 104 that includes a plurality of mounting struts such as mounting struts 106A, 106B, 106C, and 106D. More or fewer struts can be used based on the number of mounting points of a particular transmission to be tested.

Additionally or alternatively, the upper frame 102 can include mounting brackets such as bracket 108 configured to facilitate fastening the transmission to the upper frame 102. Additionally or alternatively, the upper frame 102 can include mounting plates disposed between the various beams or tubes thereof and such mounting plates can include holes in particular patterns to facilitate mounting various types of transmissions to the plates via fasteners (e.g., bolts or screws) disposed through the holes. The test fixture 100 can further include counterweights such as counterweight 109 to counterbalance a load imposed on the upper frame 102 when the transmission and other associated equipment are coupled to the upper frame 102.

The test fixture 100 or the upper frame 102 can further include other fixtures that facilitate mounting support equipment (e.g., as pumps, cooler fans, radiators, clutches, etc.) that are involved in operating the lubrication system of the transmission to the upper frame 102. For instance, the test fixture 100 can include mounting brackets or mounting plates 110, 112 that are mechanically coupled to the upper frame 102 via fasteners. Support equipment such as a motor, a cooling fan, a radiator, etc. of the lubrication system can be mounted to the upper frame via the mounting plates 110, 112.

This way, the support equipment is mounted to the upper frame 102 in addition to the transmission itself so as to accurately simulate operating conditions of the transmission and the aircraft. Mounting such supporting equipment away from the upper frame 102 or the test fixture 100 might not accurately represent operating conditions of the lubrication system on the aircraft as they might not be subjected to the rotations, vibrations, and other operating conditions to which a lubrication system of a transmission is subjected during operation of the aircraft.

Further, the configuration of the test fixture 100 avoids placing the support equipment away therefrom and having electric cables and fluid lines (e.g., hoses) connecting the support equipment to the test fixture 100. Such electric cables and hydraulic lines can be damaged during operation of the test fixture 100, which affects reliability and safety of the test fixture 100. With the configuration of the test fixture 100, the operating conditions of the lubrication system are accurately simulated, and additionally safety and reliability are enhanced.

The test fixture 100 further includes a lower frame 114 configured as a rocker. Particularly, the lower frame 114 comprises a first rocker rail 116A and a second rocker rail 116B parallel and coupled to the first rocker rail 116A (see FIG. 3). Each of the rocker rails 116A, 116B includes a curved surface, such as curved surface 117, which allows the lower frame 114 to rotate or rock (i.e., sway to the right or left in FIG. 1). The first rocker rail 116A can be coupled to the second rocker rail 116B via a plurality of support beams, rods, structures, etc. (see FIG. 3).

In examples, the lower frame 114 can include sway range limiters 118A, 118B configured to limit the range of rotation of the test fixture 100 for safety. The sway range limiters 118A, 118B protrude laterally as depicted in FIG. 1 and can have a similar curvature to the curved surfaces (e.g., the curved surface 117) of the rocker rails 116A, 116B. If a force is applied to the upper frame 102 to rotate or tilt the test fixture 100 in either direction as the rocker rails 116A, 116B trace a floor 119 to which the test fixture 100 is mounted or disposed, the test fixture 100 can rotate by a particular angle. If a malfunction occurs in an actuator that applies the force to the upper frame 102, the sway range limiters 118A, 118B can prevent the test fixture 100 from exceeding a threshold angle, as they reach the floor 119 and operate as stoppers for the test fixture 100.

Radius "R" (labelled in FIG. 1) of the curved surfaces (e.g., of the curved surface 117) of the rocker rails 116A, 116B can determine the range or extent of tilt of the test fixture 100. The radius R is measured from a center of rotation 120 of the rocker rails 116A, 116B. As an example for illustration, if R is equal to about 72 inches, then the test fixture 100 can rotate about 45 degrees in either direction. A larger diameter indicates a smaller range of rotation (e.g., ±30 degrees) for the test fixture 100, and a smaller diameter indicates a larger range of rotation (e.g., ±90 degrees or ±180 degrees more if the floor has a hollow portion to allow the test fixture to be upside down) for the test fixture 100. As such, the radius R of the rocker rails 116A, 116B can be selected to achieve a particular desired range of rotation for the transmission.

Further, the test fixture 100 is configured such that when the transmission is coupled to the upper frame 102, a center of gravity 122 of the test fixture 100 is offset by an offset amount "e" from the center of rotation 120. As depicted "e" is a small distance within a threshold distance (e.g., 3-5 inches). Because the center of gravity 122 is close to the center of rotation 120, the magnitude of force that can tilt the upper frame 102 can beneficially be reduced.

The test fixture 100 further includes a support frame 124 configured to couple the upper frame 102 to a rotatable base 126. The support frame 124 can be configured as a truss as shown in FIG. 1 having a plurality of posts or struts that supports the upper frame 102 and couple it to the rotatable base 126.

The rotatable base 126 is rotatably mounted to a central portion 127 of the lower frame 114, where the central portion 127 is disposed between and coupled to the rocker rails 116A, 116B. The test fixture 100 can include a rotary actuator 128 configured to rotate the rotatable base 126, the support frame 124 coupled thereto, and the upper frame 102 coupled to the support frame 124 about the y-axis depicted in FIG. 1. Rotation about the y-axis can be referred to as azimuth rotation. The y-axis is perpendicular to the ground.

Figure 2:
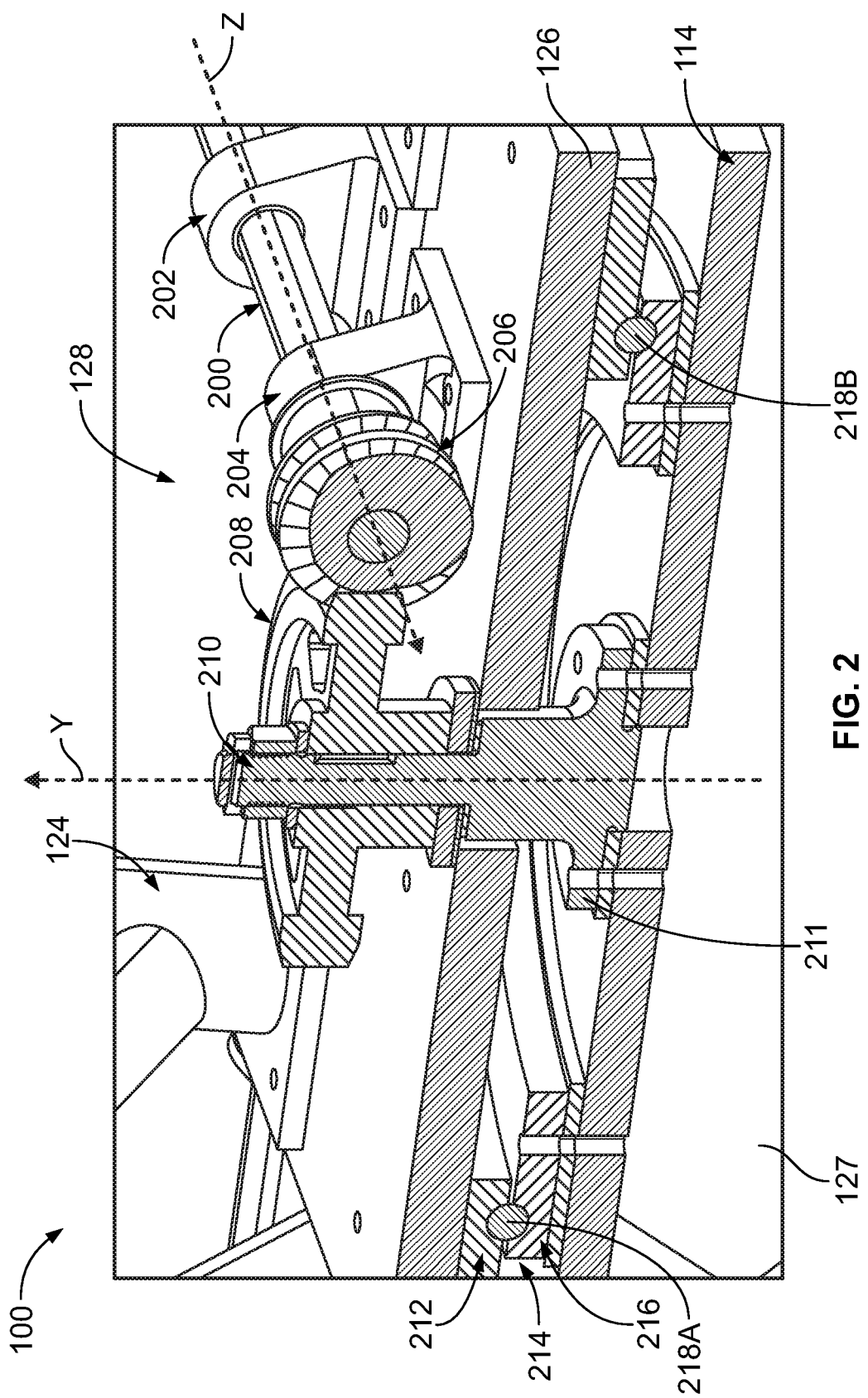
FIG. 2 illustrates a perspective partial cross-sectional view of a test fixture showing a rotary actuator, in accordance with an example implementation.

FIG. 2 illustrates a perspective partial cross-sectional view of the test fixture 100 showing the rotary actuator 128, in accordance with an example implementation. The rotary actuator 128 includes a shaft 200 mounted through a first support bracket 202 and a second support bracket 204. The support brackets 202, 204 have respective mounting bearings to which the shaft 200 is mounted to allow rotation of the shaft 200 about the z-axis along its longitudinal axis. The support brackets 202, 204 are fixedly mounted to the rotatable base 126 (e.g., via bolts or fasteners).

A first end of the shaft 200 can be coupled to a rotatable handle 130 shown in FIG. 1, whereas a second end of the shaft 200 is coupled to a worm screw 206. The worm screw 206 engages gear teeth of a worm wheel or worm gear 208. The worm gear 208 is fixedly mounted to a shaft 210 configured to be mechanically coupled (e.g., via a flange 211 and fasteners) to the lower frame 114.

Further, the rotatable base 126 is attached or coupled to an upper bearing race 212 of a slew bearing 214, whereas the lower frame 114 is attached or coupled to a lower bearing race 216 of the slew bearing 214. Bearing balls, such as bearing balls 218A, 218B, are disposed in a race formed by mating annular grooves disposed in the upper bearing race 212 and the lower bearing race 216 to enable and facilitate rotation of the upper bearing race 212 relative to the lower bearing race 216.

With this configuration, if the rotatable handle 130 is rotated about the z-axis depicted in FIG. 2, the shaft 200 and the worm screw 206 rotate therewith, while the worm gear 208 remains fixed. As a result, torque applied to the rotatable handle 130 is transmitted to a torque applied about the y-axis on the worm gear 208. Because the worm gear 208 if fixed, a reaction torque is applied on the worm screw 206 and the shaft 200. The reaction torque is then transmitted to the rotatable base 126 via the support brackets 202, 204. As a result, the rotatable base 126 rotates along with the upper bearing race 212 relative to the lower bearing race 216 and the lower frame 114. As such, while the rocker rails 116A, 116B allow the lower frame 114, the support frame 124, and the upper frame 102 to rock about a first axis (the z-axis), rotating the rotatable handle 130 about the z-axis causes the rotatable base 126, the support frame 124, and the upper frame 102 to rotate about a second axis (the y-axis) perpendicular to the first axis (the z-axis). The z-axis represents an axis that is parallel to the ground and is coincident with, or parallel to, a longitudinal axis of an axle of wheels of an aircraft.

The rotary actuator 128 configuration shown in and described with respect to FIG. 2 is an example for illustration, and other rotary actuator configurations can be used. For example, rather than the rotatable handle 130, a motor can be used to rotate the shaft 200. In another example, an electric or hydraulic motor can be mounted to the lower frame where an output shaft of such motor can be coupled to the rotatable base 126 to rotate it as the motor is actuated. In another example, a linear actuator (hydraulic cylinder or linear screw drive) can be mounted to the rotatable base 126 offset from its center, such that if the actuator is extended or retracted, the rotatable base 126 rotates about the y-axis relative to the lower frame 114. A controller (e.g., a computing device having one or more processors) of the test fixture 100 can send a signal to such motors or actuators to cause the rotatable base 126 to rotate.

Referring back to FIG. 1, with the configuration of the test fixture 100, the upper frame 102 can be titled about the z-axis because of the curvature of the rocker rails 116A, 116B. Such tilt motion can correspond to or simulate a pitch rotation of an aircraft. Further, the rotary actuator 128 enables rotation of the upper frame 102 about the azimuth y-axis relative to the lower frame 114. Rotating the upper frame 102 by 90 degrees about the y-axis then tilting the upper frame 102 about the z-axis can correspond to or simulate rolling of the aircraft. Rotating the upper frame 102 about the azimuth y-axis relative to the lower frame 114 via the rotary actuator 128 by an angle that is between 0 degrees and 90 degrees (e.g., 45 degrees) then tilting the upper frame 102 about the z-axis can correspond to or simulate a combination of pitch and roll motion of the aircraft.

Figure 3:
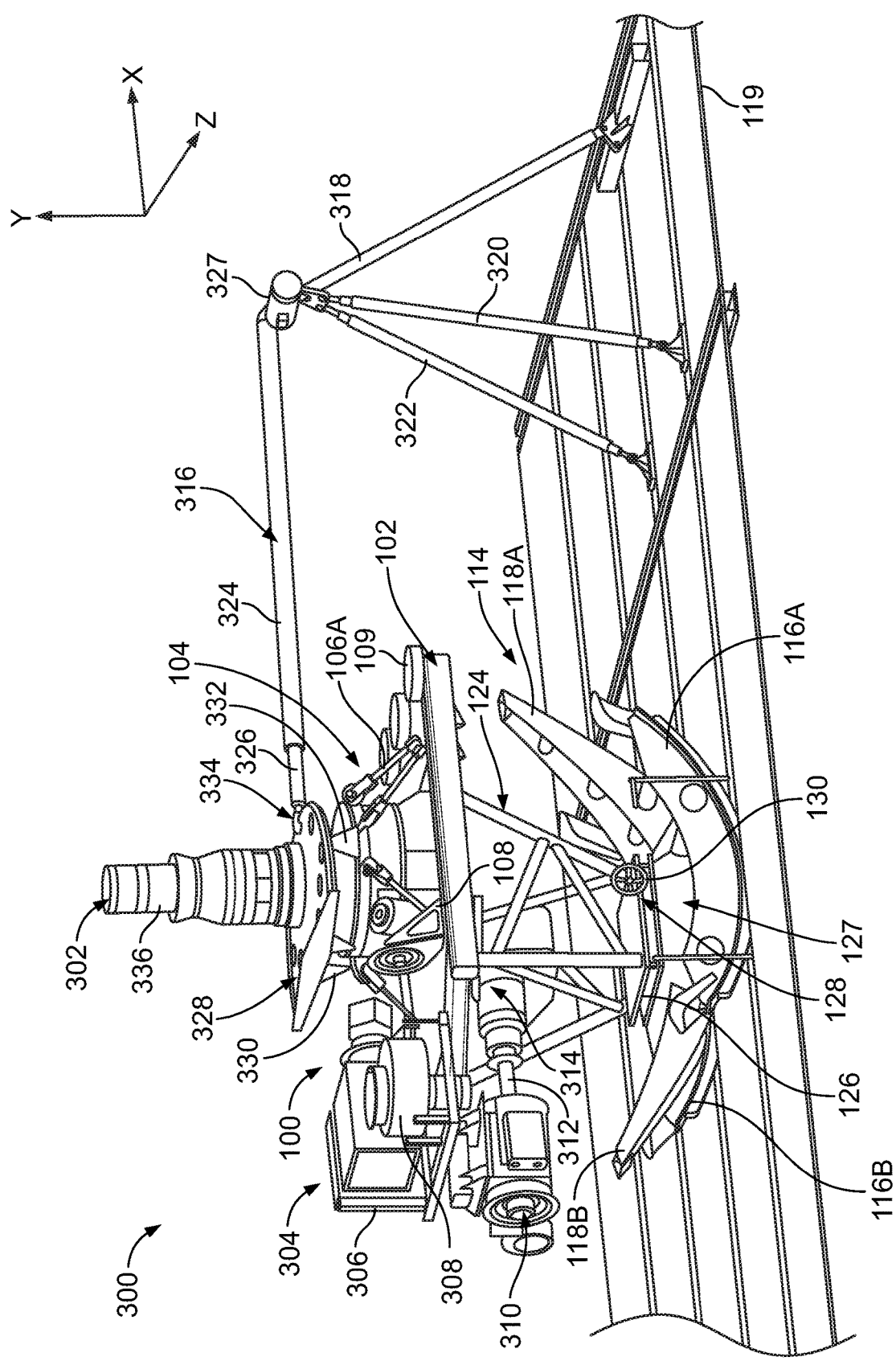
FIG. 3 illustrates a perspective view of a testing system, including the test fixture shown in FIG. 1, in accordance with an example implementation.

FIG. 3 illustrates a perspective view of a testing system 300, including the test fixture 100, in accordance with an example implementation. The testing system 300 is configured to enable simulating effects of pitch and roll of an aircraft on a transmission 302 mounted to the test fixture 100. Particularly, the transmission 302 can be mounted to the upper frame 102 via the mounting system 104 (e.g., via the mounting struts 106A-106D, the bracket 108, etc.).

In addition to the transmission 302 being mounted to the upper frame 102, other supporting equipment of a lubrication system of the transmission 302 are also mounted to the test fixture 100. For example, a cooling system 304 configured to cool the lubrication fluid is mounted to the upper frame 102. The cooling system 304 can include a radiator 306 (i.e., a heat exchanger) and a cooler fan or blower 308. An onboard pump of the transmission 302 can be used to circulate the lubrication oil through the transmission 302 and the cooling system 304. Other components such as hoses or fluid lines that fluidly couple the transmission 302 to other components of the lubrication system (e.g., the pump) can also be mounted to the test fixture 100.

Further, a drive motor 310 can also be coupled to the upper frame 102 (e.g., via the mounting plates 110, 112). The drive motor 310 is configured to rotate a drive shaft 312, which is coupled (e.g., via flexible couplings) to a gear box 314. The gear box 314 in turn is configured to drive the transmission 302 (i.e., rotate the shafts of the transmission 302). The drive system that includes the drive motor 310, the drive shaft 312, and the gear box 314 is configured to drive the transmission 302 at the full speed at which the transmission 302 can operate on the aircraft. Other components of the drive system (e.g., power cables providing electric power to the drive motor 310) are not shown in FIG. 3 to reduce visual clutter in the drawing.

The testing system 300 further includes a pitching actuator 316. The pitching actuator 316 can be mounted via, for example, a 3-point mounting system that includes support struts or support rods 318, 320, and 322. The support rods 318, 320, and 322 are coupled to the floor 119. The pitching actuator 316 as shown in FIG. 3 can be configured as a linear actuator (e.g., a hydraulic cylinder or a linear electrical screw drive) having a cylinder 324 and a rod 326 configured to extend and retract within or relative to the cylinder 324. For instance, if the pitching actuator 316 is configured as a linear electrical screw drive, an electric motor 327 can be used to actuate the screw (e.g., the rod 326) to move within the cylinder 324.

As depicted in FIG. 3, the testing system 300 includes a clamping ring 328 having a hole therein. The transmission 302 is disposed through the hole of the clamping ring 328, and the transmission 302 is coupled (e.g., via clamps) to the clamping ring 328 such that if the clamping ring 328 moves, the transmission 302 moves therewith.

The clamping ring 328 can be mounted and coupled to the test fixture 100 via support brackets, such as bracket 330 and bracket 332. As such, the transmission 302, the clamping ring 328, and the test fixture 100 are coupled to each other and can move together.

Further, the rod 326 of the pitching actuator 316 is releasably coupled to the clamping ring 328 via a releasable clamp 334. When the releasable clamp 334 clamps the clamping ring 328, the pitching actuator 316 is coupled to the clamping ring 328. The releasable clamp 334 can be released to decouple the pitching actuator 316 from the clamping ring 328, so as to allow rotation of the test fixture 100 along with the clamping ring 328 and the transmission 302 when the rotary actuator 128 is triggered or actuated.

In the position shown in FIG. 3, the transmission 302 and its lubrication system can be tested while the transmission 302 is aligned with the y-axis to simulate normal level flight (e.g., zero pitch and roll angles). In other words, the angle between a longitudinal axis of a shaft 336 of the transmission 302 and the y-axis is substantially zero, and thus the pitch and roll angles are substantially zero. The term "substantially zero" is used herein to indicate that an angle is within a threshold angle, such as 5 degrees, from zero angle.

In the position shown in FIG. 3, the drive motor 310 can be actuated to run the transmission 302 at a particular speed, e.g., the maximum speed at which the shaft 336 of the transmission 302 is expected to rotate at low or no load on the transmission 302 (e.g., speed of 250 revolutions per minute). The test can last a particular period of time (e.g., 15-20 minutes) and during the test, various parameters of the lubrication system can be recorded. For instance, temperatures of lubrication fluid circulating through the lubrication system and the transmission 302 can be recorded as well as pressure levels of the lubrication fluid. The parameters can be recorded at various locations within the transmission 302 and the lubrication system.

By comparing the temperatures and pressures of the lubrication fluid to threshold temperature and pressure values, efficiency and effectiveness of the lubrication system in cooling the transmission 302 can be evaluated. For example, if temperature of the lubrication fluid stabilizes after a particular period of time at a temperature value less than a temperature threshold, and the pressure level of the fluid is within a threshold value (e.g., 20 pounds per square inch) from a threshold pressure value, then the lubrication system can be considered effective.

Upon obtaining sufficient data with the transmission 302 being disposed at zero pitch and roll angles, the transmission 302 can be tilted via the pitching actuator 316 to increase the pitch angle of the transmission 302. Particularly, the pitching actuator 316 can be actuated so as to extend the rod 326 thereof, thereby pushing the upper frame 102 of the test fixture 100. The curvature of the rocker rails 116A, 116B allows the test fixture 100 and the transmission 302 coupled thereto to rotated about the z-axis, thereby changing the pitch angle of the transmission 302.

Figure 4:
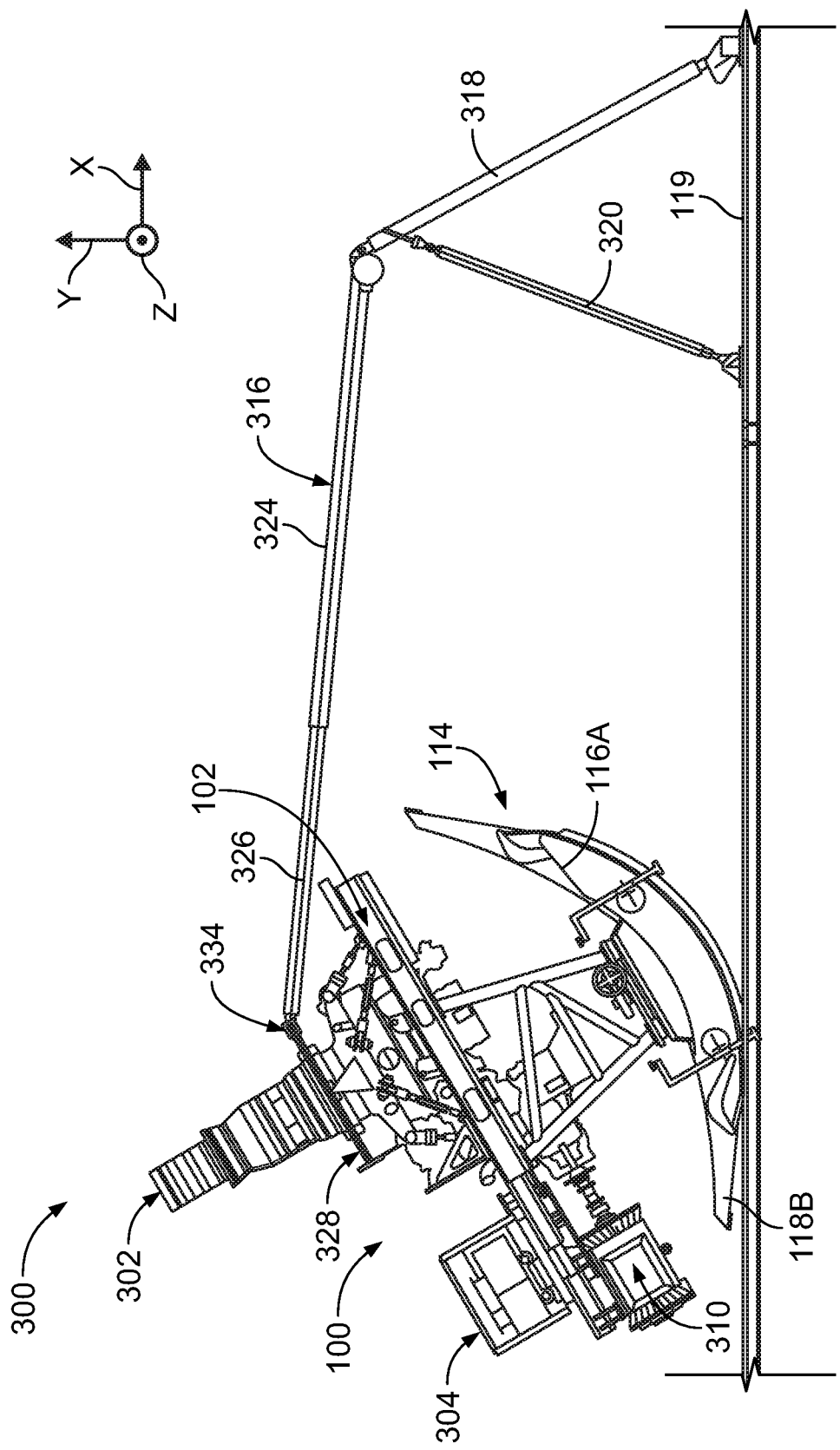
FIG. 4 illustrates a side view of the testing system shown in FIG. 3, in accordance with an example implementation.

FIG. 4 illustrates a side view of the testing system 300, with the test fixture 100 rotated by a particular positive pitch angle, in accordance with an example implementation. As shown in FIG. 4, the rod 326 of the pitching actuator 316 is extended. As the rod 326 is extending, it pushes the test fixture 100 via applying a force on the clamping ring 328. As a result of the curvature of the rocker rails 116A, 116B, the upper frame 102 rotates about the z-axis, rendering the transmission 302 positioned at a particular pitch angle. For example, as shown in FIG. 4, the pitch angle can be a positive 30 degree angle.

Different pitch angles can be achieved by varying the stroke of the rod 326 of the pitching actuator 316. The maximum stroke of the rod 326 along with curvature of the rocker rails 116A, 116B can determine the maximum pitch angle that can be achieved. Thus, the pitching actuator 316 and the curvature of the rocker rails 116A, 116B can be selected to achieve desired pitch angles. The sway range limiter 118B can be configured to be at a particular angle (e.g., 5 degrees) from the floor 119 when the rod 326 is fully extended.

Similar to the test described above, while the transmission 302 is pitched to the particular pitch angle shown in FIG. 4, a test can be run where the drive motor 310 runs the transmission 302 at a particular test speed for a particular period of time. During the test, the various parameters (e.g., temperatures and pressures of fluid) of the lubrication system can be recorded. By comparing the temperatures and pressures of the lubrication fluid to threshold temperature and pressure values, efficiency and effectiveness of the lubrication system in cooling the transmission 302 when the transmission 302 is pitched to an extreme position (e.g., a maximum expected positive pitch angle of the aircraft) can be evaluated. The test can be repeated at various pitch angles.

Beneficially, test data can be recorded not only at particular discreet pitch angles, but also during movement of the transmission 302 as the transmission 302 is rotated from a first pitch angle (e.g., zero degrees) to a second pitch angle (positive 30 degrees about the z-axis). This way, performance of the lubrication system can be evaluated under dynamic conditions during transitions from one pitch angle to another, as well as at particular discreet pitch angles.

It may be desired to test the transmission 302 and the lubrication system while the transmission 302 is pitched to a negative pitch angle relative to the z-axis. In an example, the rod 326 of the pitching actuator 316 can be retracted, rather than extended, so as to pull the transmission 302 and the upper frame 102 to rotate the transmission 302 to a negative pitch angle. In another example, if the stroke of rod 326 might not allow achieving a desired range of negative and positive pitch angles, position of the pitching actuator 316 can be changed so as to enable pitching the transmission 302 to a particular negative pitch angle.

Particularly, the pitching actuator 316 can be moved from a first position or first location shown in FIGS. 3-4 to a second position or second location where the pitching actuator 316 is coupled to a lower end of the support rod 318 rather than its upper end. With this configuration, the pitching actuator 316 can be coupled to the clamping ring 328 with the rod 326 disposed in an extended position, and when the rod 326 is retracted, a large negative pitch angle can be achieved. In the first position or first location shown in FIGS. 3-4, the pitching actuator 316 is disposed at a first angle (e.g., less than 10 degrees) relative to the x-axis or the floor 119, whereas in the second position, the pitching actuator 316 can be disposed at a second angle that is larger than the first angle (e.g., the second angle can be between 20 and 45 degrees) with the x-axis or the floor 119. In the first position, the pitching actuator 316 allows the upper frame 102 to rock about the z-axis in a first direction (e.g., positive pitch angles), whereas in the second position, the pitching actuator 316 allows the upper frame 102 to rock about the z-axis in a second direction opposite the first direction (e.g., negative pitch angles).

Figure 5:
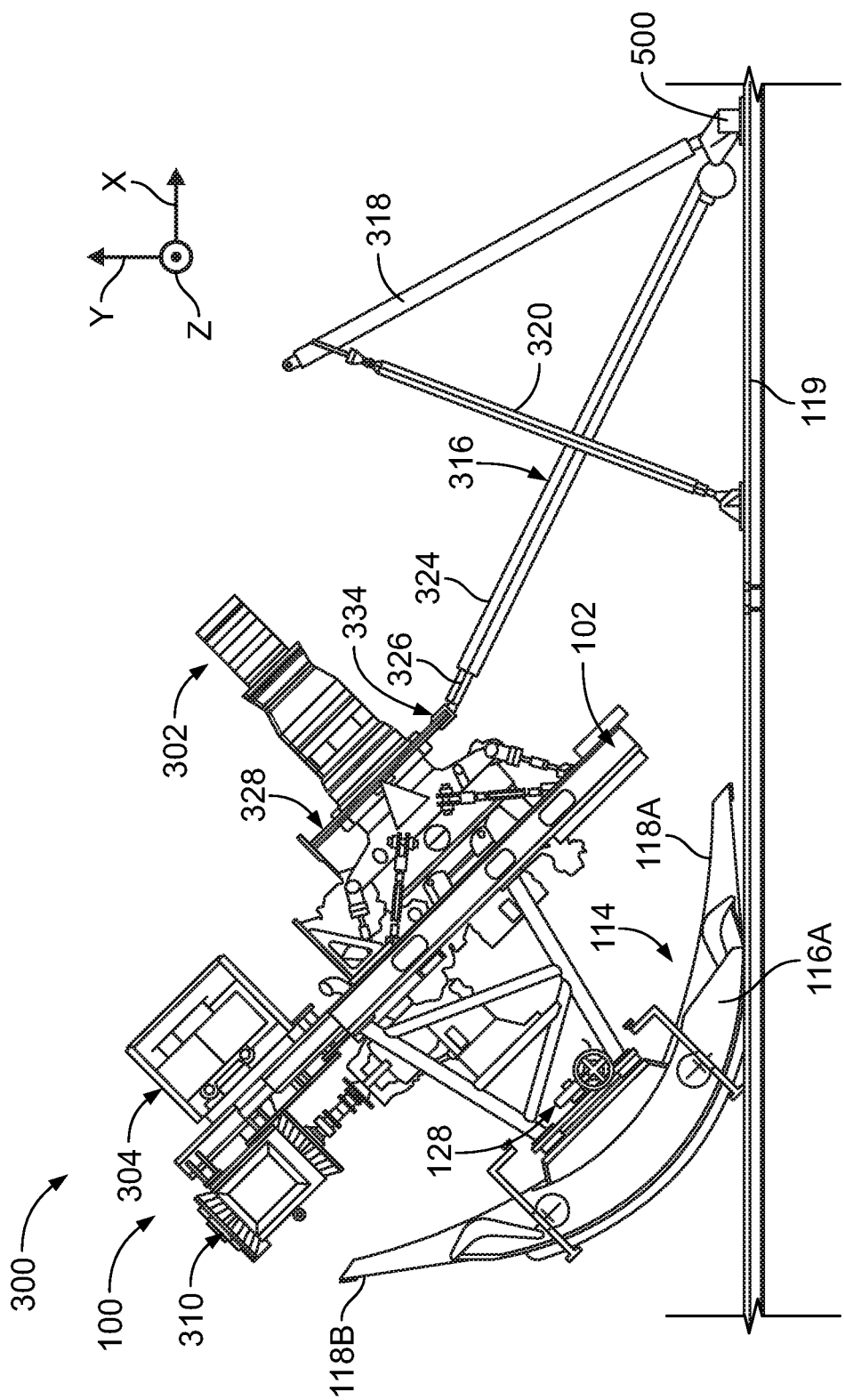
FIG. 5 illustrates a side view of the testing system shown in FIG. 3, with the test fixture rotated by a particular negative pitch angle, in accordance with an example implementation.

FIG. 5 illustrates a side view of the testing system 300, with the test fixture 100 rotated by a particular negative pitch angle, in accordance with an example implementation. As shown in FIG. 5, the pitching actuator 316 is mounted differently compared to FIGS. 3-4. Particularly, the pitching actuator 316 is coupled at a lower end of the support rod 318 or is coupled to the floor 119 via a tube 500 fixedly mounted to the floor 119, such that the pitching actuator 316 is disposed at a larger angle (e.g., about 30 degrees) relative to the x-axis or the floor 119 compared to the position shown in FIGS. 3-4. With this configuration, the rod 326 can be coupled to the clamping ring 328 in an extended position, such that when the pitching actuator 316 is actuated to retract the rod 326, the transmission 302 along with the test fixture 100 are pulled, and the lower frame 114 allows the transmission 302 to rotate about the z-axis to a particular negative pitch angle.

For example, as shown in FIG. 5, the pitch angle can be a negative angle of about 45 degrees. Different negative pitch angles can be achieved by varying the retraction stroke (i.e., the extent of retracting) of the rod 326. The maximum retraction stroke of the rod 326 along with curvature of the rocker rails 116A, 116B can determine the maximum negative pitch angle that can be achieved. Thus, the pitching actuator 316 and the curvature of the rocker rails 116A, 116B can be selected to achieve desired pitch range angles, i.e., a range between a maximum positive pitch angle and a maximum negative pitch angle, such as from +45 degrees to −45 degrees, for example.

Similar to the tests described above, while the transmission 302 is pitched to the particular negative pitch angle shown in FIG. 5, a test can be run where the drive motor 310 runs the transmission 302 at a particular test speed for a particular period of time. During the test, the various parameters (e.g., temperatures and pressures of fluid) of the lubrication system can be recorded. By comparing the temperatures and pressures of the lubrication fluid to threshold temperature and pressure values, efficiency and effectiveness of the lubrication system in cooling the transmission 302 when the transmission 302 is pitched to an extreme negative pitch angle (e.g., a maximum expected negative pitch angle of the aircraft) can be evaluated. The test can be repeated at various negative pitch angles.

As mentioned above, beneficially, as mentioned above, test data can be recorded not only at the particular discreet negative pitch angles, but also during movement of the transmission 302 as the transmission 302 is rotated from one pitch angle to another pitch angle. This way, performance of the lubrication system can be evaluated under dynamic conditions during transitions from one pitch angle to another, as well as at particular discreet pitch angles.

Also, beneficially, in addition to pitch angles, the testing system 300 allows for testing the transmission 302 and its lubrication system at various roll angles in a compact configuration. Rather than adding a roll actuator to the testing system 300 to roll the transmission about the x-axis, the upper frame 102 and the transmission 302 can be rotated about the y-axis via the rotary actuator 128, and then the pitching actuator 316 can be actuated to roll the transmission 302. Particularly, pitching the transmission 302 after rotation about the y-axis corresponds to or simulates rolling the transmission 302 when installed in an aircraft. Thus, the pitching actuator 316 is configured as both a pitching and rolling actuator.

Particularly, referring back to FIG. 3, the clamping ring 328 can be configured as a semi-circular ring. The releasable clamp 334 can be released to allow a semi-circular rim of the clamping ring 328 to rotate about the y- or azimuth axis relative to the releasable clamp 334 (now released) so as to allow positioning the transmission 302 at a different azimuth angle. The releasable clamp 334 can then be triggered to clamp the clamping ring 328 to couple the pitching actuator 316 to the clamping ring 328 to allow for pitching the transmission 302.

Figure 6:
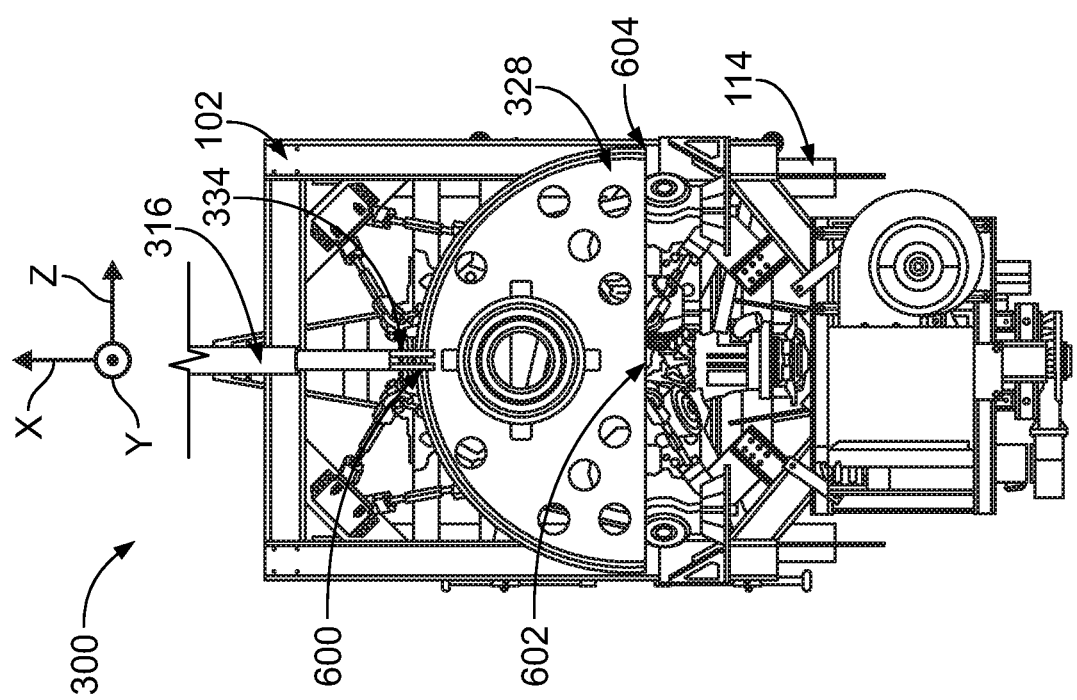
FIG. 6 illustrates a top view of the testing system of FIG. 3 configured for pure pitching of a transmission, in accordance with an example implementation.

FIG. 6 illustrates a top view of the testing system 300 configured for pure pitching of the transmission 302, in accordance with an example implementation. As shown in FIG. 6, the pitching actuator 316 is coupled to the clamping ring 328 at a point 600 that is at the middle of the arc of the semi-circular rim of the clamping ring 328. From a view point of a center 602 of the arc of the clamping ring 328, the point 600 is at a 90 degree angle relative to an end point 604 of the arc. This position corresponds to the position shown in FIGS. 3-5, and actuating the pitching actuator 316 in this position corresponds to or simulates pure pitching of the transmission 302. Pitching the transmission 302 via the pitching actuator 316 after rotating the upper frame 102 via the rotary actuator 128 to a particular azimuth angle corresponds to rolling the transmission 302 or a combination of rolling and pitching the transmission 302 based on a magnitude of the particular azimuth angle.

Figure 7:
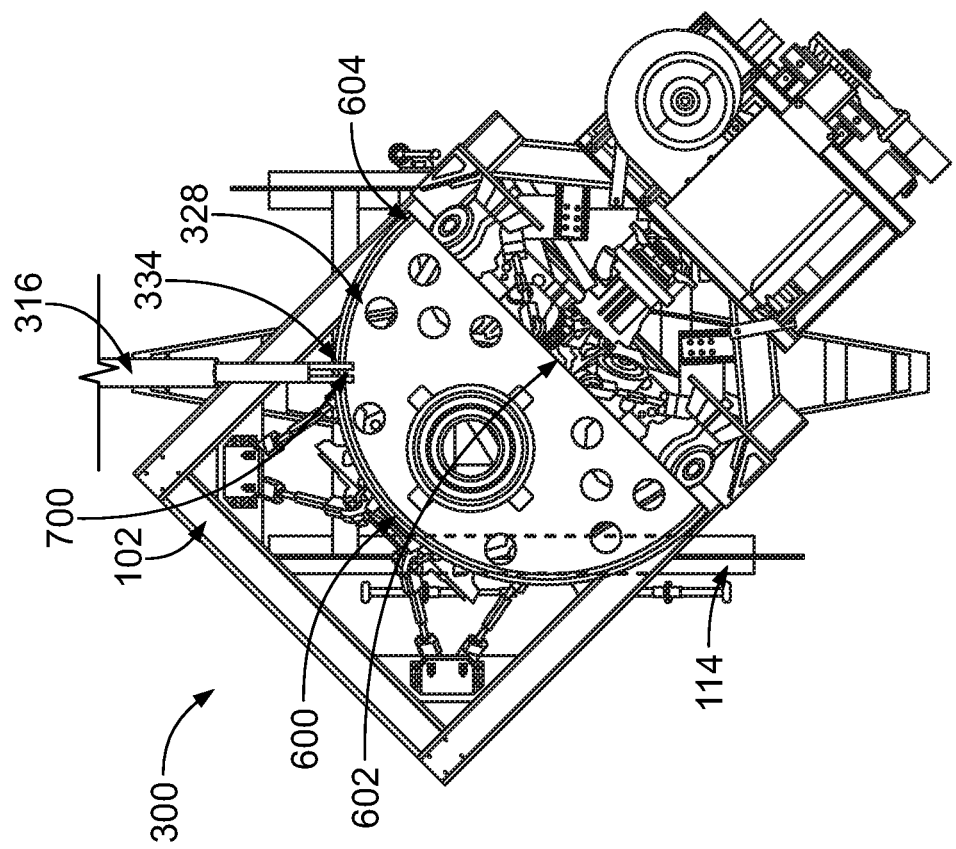
FIG. 7 illustrates a top view of the testing system of FIG. 3 configured for a combination of pitching and rolling of a transmission, in accordance with an example implementation.

FIG. 7 illustrates a top view of the testing system 300 configured for a combination of pitching and rolling of the transmission 302, in accordance with an example implementation. The releasable clamp 334 can be released to allow the clamping ring 328 to rotate, when the rotary actuator 128 is actuated, about the y-axis by an angle less than 90 degrees. Then, the releasable clamp 334 can clamp again on the clamping ring 328 at a point 700 along the arc of the clamping ring 328. The point 700 is between the end point 604 and the point 600 as depicted in FIG. 7, and thus from a view point of the center 602 of the arc of the clamping ring 328, the point 700 is at an angle that is less than 90 degree angle (e.g., 45 degrees) relative to the end point 604 of the arc. In the position shown in FIG. 7, actuating the pitching actuator 316 to tilt the transmission 302 about the z-axis corresponds to or simulates a combined rolling and pitching motion of the aircraft.

Figure 8:
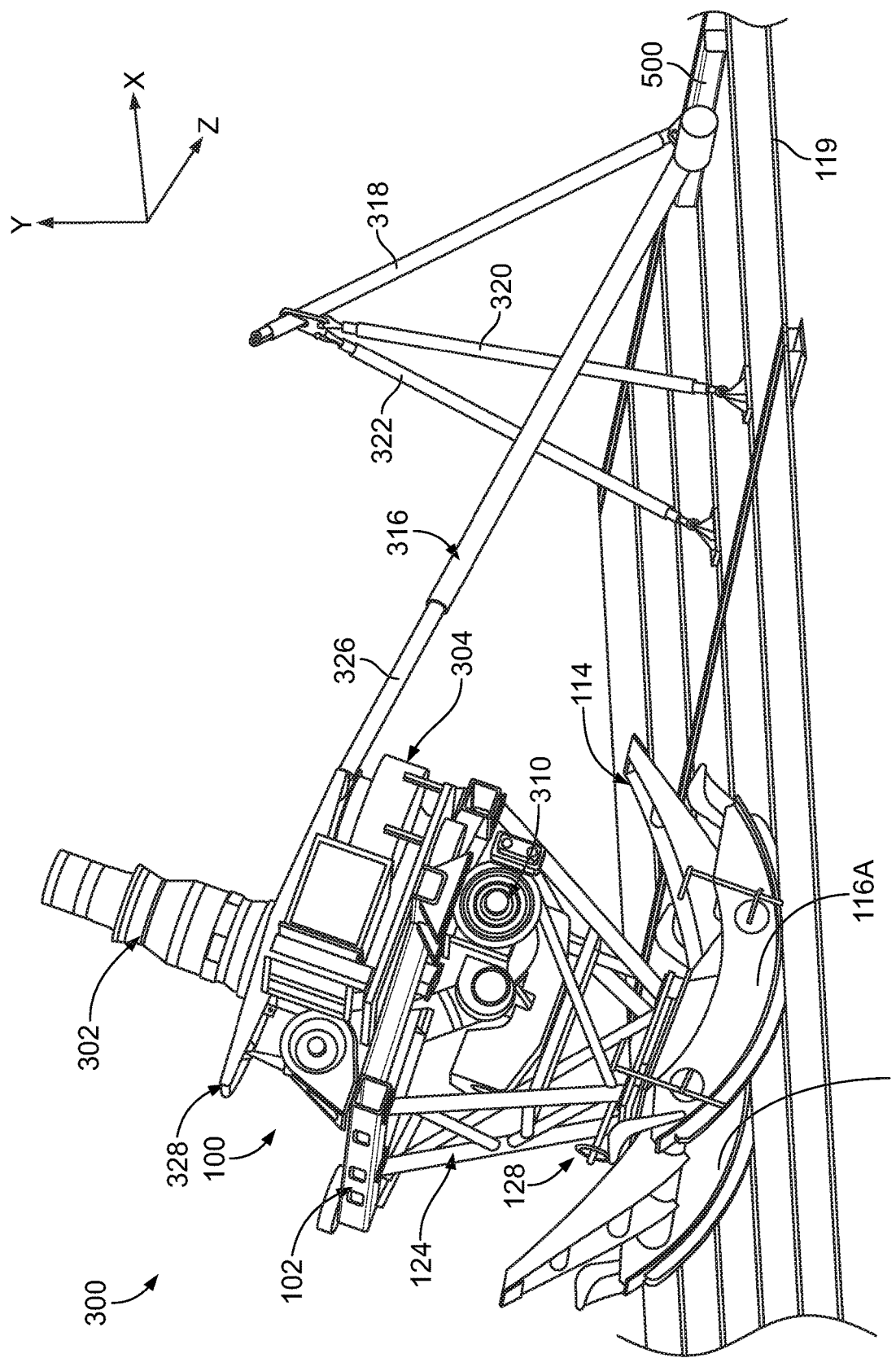
FIG. 8 illustrates a perspective view of the testing system of FIG. 3 configured for a combination of pitch and roll of a transmission, in accordance with an example implementation.

FIG. 8 illustrates a perspective view of the testing system 300 configured for a combination of pitch and roll of the transmission 302, in accordance with an example implementation. For example, the position shown in FIG. 8 depicts a rotation of the upper frame 102 and the transmission 302 about the y-axis (azimuth) of about 75 degrees, and the pitching actuator 316 is actuated (the rod 326 is retracted) to tilt the transmission 302 to a negative angle of about 22 degrees about the z-axis. Tilting the transmission 302 about the z-axis after rotating upper frame 102 the 75 degrees corresponds to a combined roll and pitch motion of the aircraft.

Similar to the tests described above, while the transmission 302 is in the position shown in FIG. 8, a test can be run where the drive motor 310 runs the transmission 302 at a particular test speed for a particular period of time. During the test, the various parameters (e.g., temperatures and pressures) of the lubrication system can be recorded. By comparing the temperatures and pressures of the lubrication fluid to threshold temperature and pressure values, efficiency and effectiveness of the lubrication system in cooling the transmission 302 when the aircraft performs a combined roll and pitch maneuver can be evaluated. The test can be repeated at various negative pitch angles and at different azimuth angles to test different combination of roll and pitch angles. Beneficially, as mentioned above, test data can be recorded not only at the particular discreet angles, but also under dynamic conditions during transitions from one angle to another, as well as at particular discreet angles.

Figure 9:
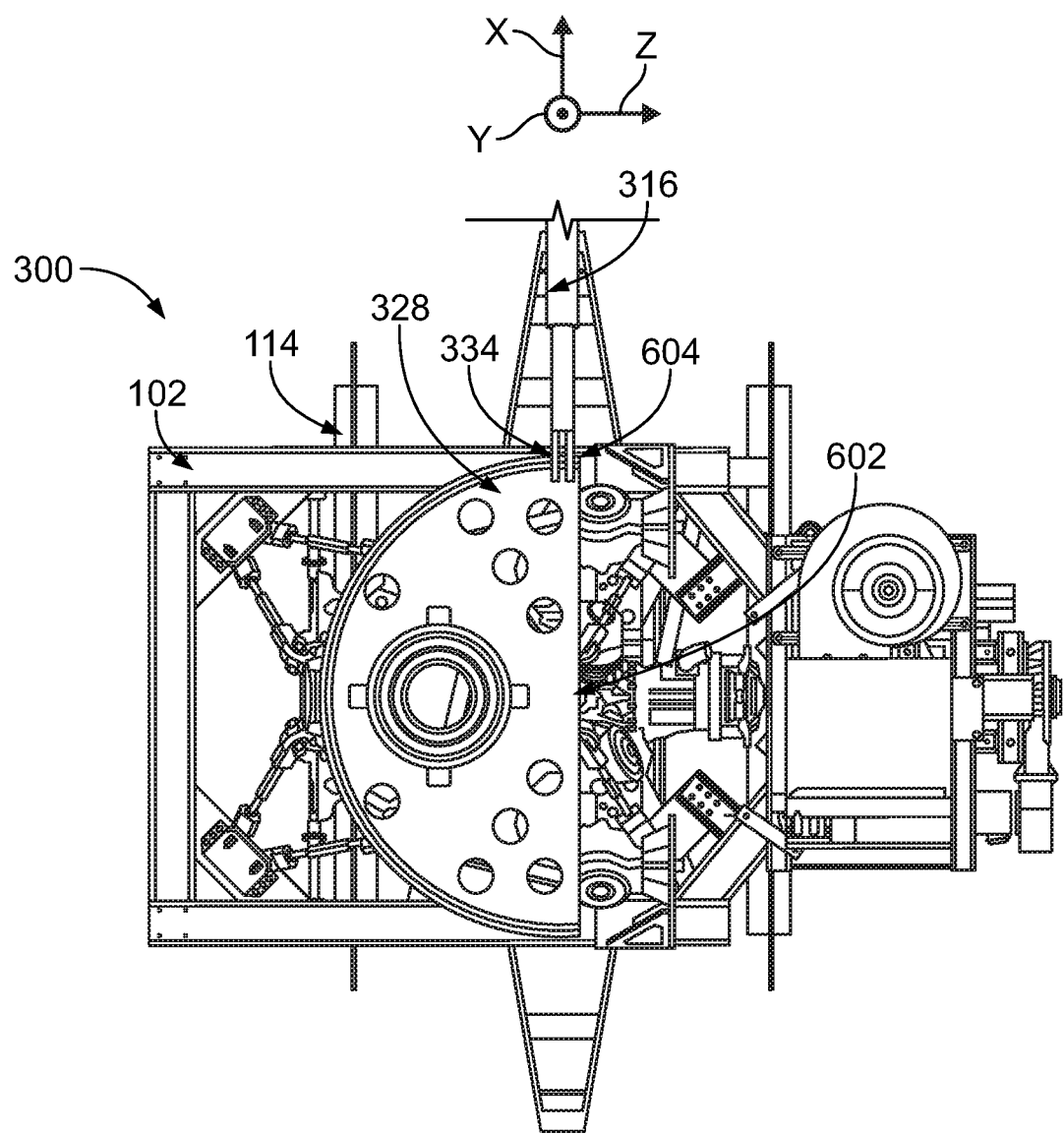
FIG. 9 illustrates a top view of the testing system of FIG. 3 configured for pure rolling of a transmission, in accordance with an example implementation.

If the upper frame 102 is rotated 90 degrees about the y-axis via the rotary actuator 128, then pitching the transmission 302 about the z-axis corresponds to or simulates pure rolling thereof. FIG. 9 illustrates a top view of the testing system 300 configured for pure rolling of the transmission 302, in accordance with an example implementation. The releasable clamp 334 can be released to allow the clamping ring 328 to rotate, when the rotary actuator 128 is actuated, about the y-axis by an angle of 90 degrees relative to the pure pitching position of FIGS. 3-6. Then, the releasable clamp 334 can clamp again on the clamping ring 328 at the end point 604 of the clamping ring 328. In this position, the center 602 and the end point 604 are aligned along the x-axis. In the position shown in FIG. 7, actuating the pitching actuator 316 to tilt the transmission about the z-axis corresponds to or simulates pure rolling motion of the aircraft.

Figure 10:
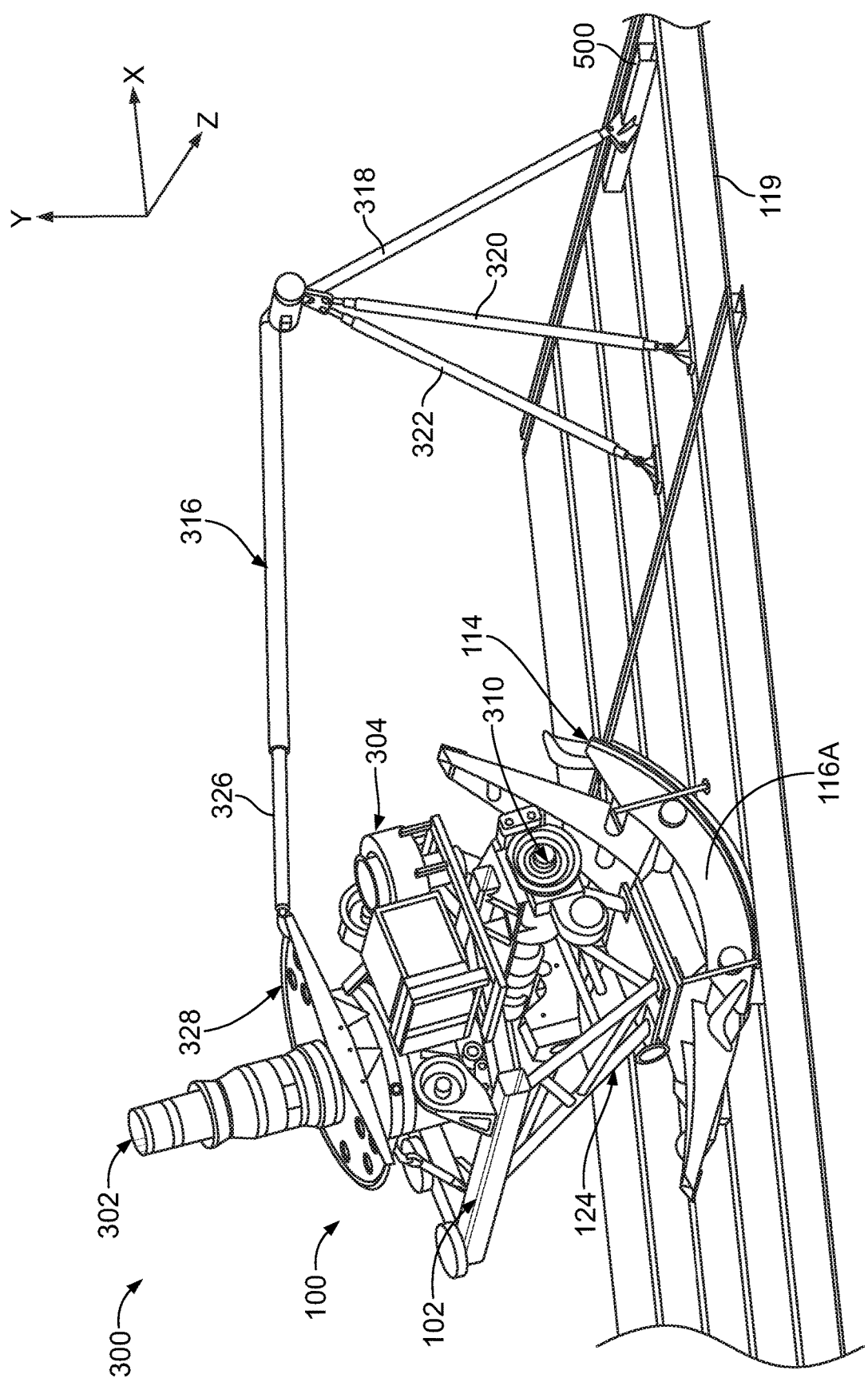
FIG. 10 illustrates a perspective view of the testing system of FIG. 3 configured for pure rolling of a transmission, in accordance with an example implementation.

FIG. 10 illustrates a perspective view of the testing system 300 configured for pure rolling of the transmission 302, in accordance with an example implementation. For example, the position shown in FIG. 10 depicts a rotation of the upper frame 102 and the transmission 302 about the y-axis (azimuth) of about 90 degrees, and then the pitching actuator 316 is actuated (the rod 326 is extended) to tilt the transmission 302 by a positive angle of about 15 degrees about the z-axis. Tilting the transmission 302 about the z-axis after rotating the upper frame 102 by a 90 degree angle corresponds to or simulates pure rolling motion of the aircraft. It is noted that the position of the pitching actuator 316 is moved to the position shown in FIG. 3 to enable positive pitch angles (i.e., the pitching actuator 316 is coupled to an upper end of the support rod 318.

Similar to the test described above, while the transmission 302 is in the position shown in FIG. 10, a test can be run where the drive motor 310 runs the transmission 302 at a particular test speed for a particular period of time. During the test, the various parameters (e.g., temperatures and pressures) of the lubrication system can be recorded. By comparing the temperatures and pressures of the lubrication fluid to threshold temperature and pressure values, efficiency and effectiveness of the lubrication system in cooling the transmission 302 when the aircraft performs a roll maneuver can be evaluated. The test can be repeated at various positive roll angles. Further, the pitching actuator 316 can be moved to the position shown in FIG. 8 to enable negative roll angles (i.e., the pitching actuator 316 can be coupled to the tube 500).

Beneficially, as mentioned above, test data can be recorded not only at the particular discreet angles, but also during movement of the transmission 302 as the transmission 302 is rotated from one roll angle to another roll angle. This way, performance of the lubrication system can be evaluated under dynamic conditions.

Figure 11:
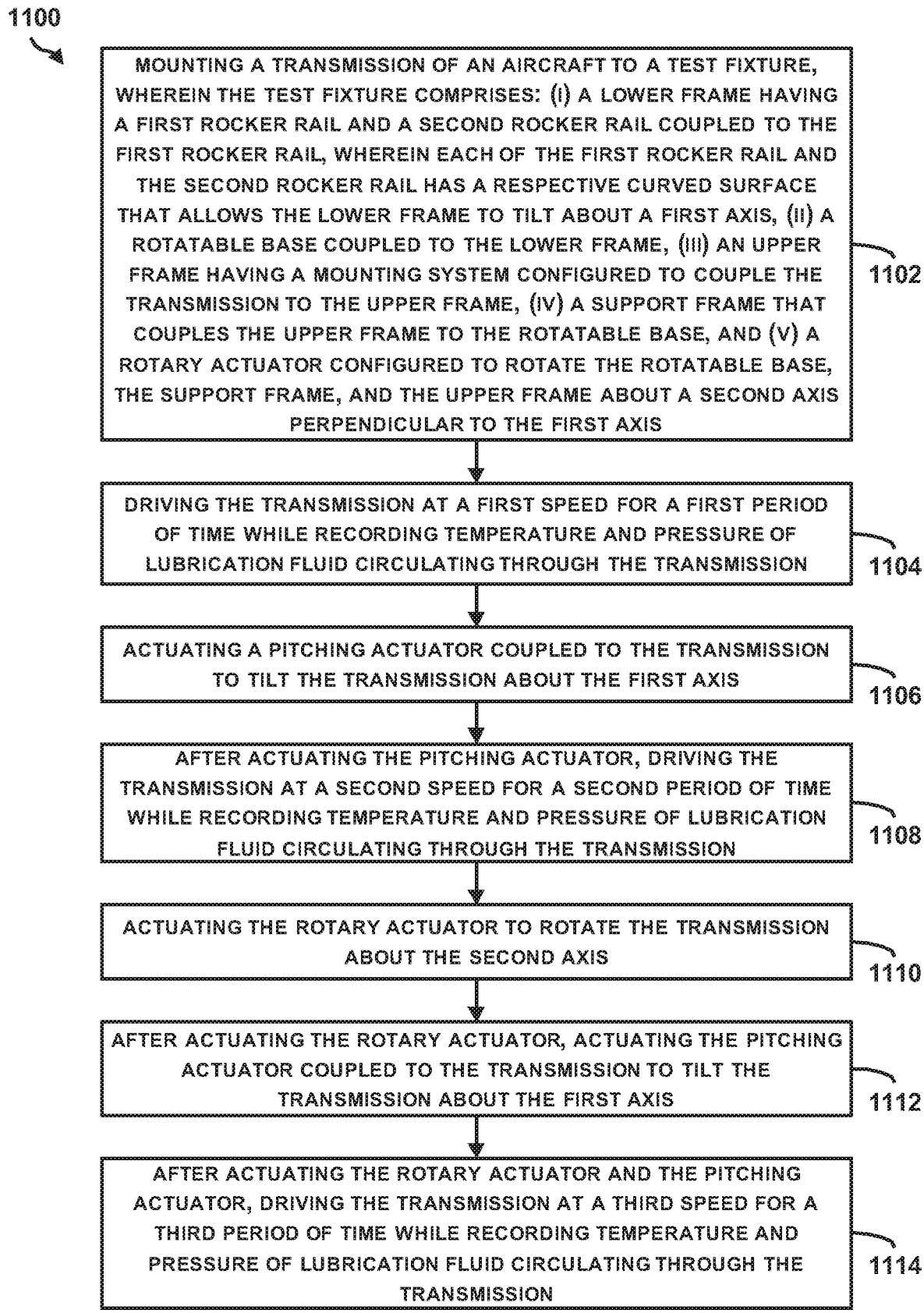
FIG. 11 is a flowchart of a method for testing a transmission of an aircraft, in accordance with an example implementation.

FIG. 11 is a flowchart of a method 1100 for testing a transmission of an aircraft, in accordance with an example implementation. The method 1100 could, for example, be used with the testing system 300. Further, FIGS. 12-15 are flowcharts of methods for use with the method 1100.

The method 1100 may include one or more operations, or actions as illustrated by one or more of blocks 1102-1114, 1200, 1300-1302, 1400, 1402, and 1404, and 1500. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1102, the method 1100 includes mounting the transmission 302 of an aircraft to the test fixture 100. As discussed above, the test fixture 100 comprises: (i) the lower frame 114 having the first rocker rail 116A and the second rocker rail 116B coupled to the first rocker rail 116A, wherein each of the first rocker rail 116A and the second rocker rail 116B has a respective curved surface (e.g., the curved surface 117) that allows the lower frame 114 to tilt about a first axis (the z-axis), (ii) the rotatable base 126 coupled to the lower frame 114, (iii) the upper frame 102 having the mounting system 104 configured to couple the transmission 302 to the upper frame 102, (iv) the support frame 124 that couples the upper frame 102 to the rotatable base 126, and (v) the rotary actuator 128 configured to rotate the rotatable base 126, the support frame 124, and the upper frame 102 about a second axis (the y-axis) perpendicular to the first axis (the z-axis).

At block 1104, the method 1100 includes driving the transmission 302 (e.g., via the drive motor 310) at a first speed (e.g., 250 revolutions per minute) for a first period of time (e.g., 15-20 minutes) while recording temperature and pressure of lubrication fluid circulating through the transmission 302.

At block 1106, the method 1100 includes actuating the pitching actuator 316 coupled to the transmission 302 to tilt the transmission 302 about the first axis (the z-axis).

At block 1108, the method 1100 includes after actuating the pitching actuator 316, driving the transmission 302 at a second speed for a second period of time while recording temperature and pressure of lubrication fluid circulating through the transmission 302. The second speed can be similar to the first speed and the second period of time can be similar to the first period of time.

At block 1110, the method 1100 includes actuating the rotary actuator 128 to rotate the transmission 302 about the second axis (the y-axis).

At block 1112, the method 1100 includes after actuating the rotary actuator 128, actuating the pitching actuator 316 coupled to the transmission 302 to tilt the transmission 302 about the first axis (the z-axis).

At block 1114, the method 1100 includes after actuating the rotary actuator 128 and the pitching actuator 316, driving the transmission 302 at a third speed for a third period of time while recording temperature and pressure of lubrication fluid circulating through the transmission 302. After the rotary actuator 128 rotates the transmission about the y-axis (azimuth) by a particular angle, actuating the pitching actuator 316 corresponds to a combination of roll and pitch, or pure roll motion of the aircraft based on a magnitude of the particular angle. The third speed can be similar to the first or second speed and the second period of time can be similar to the first or second period of time.

Figure 12:
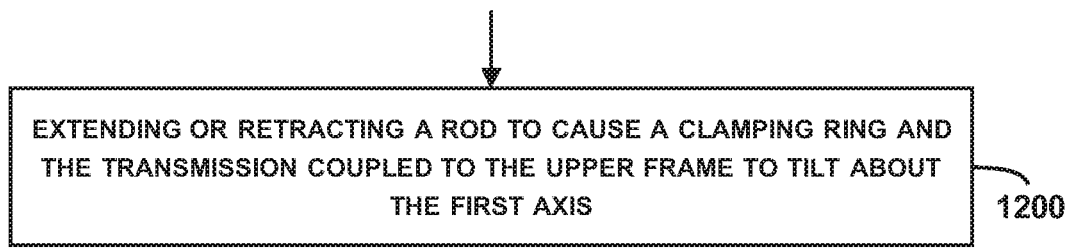
FIG. 12 is a flowchart of additional operations that may be executed and performed with the method of FIG. 11, in accordance with an example implementation.

FIG. 12 is a flowchart of additional operations that may be executed and performed with the method 1100, in accordance with an example implementation. As described above, the clamping ring 328 can be coupled to the upper frame 102 and configured to be coupled to the transmission 302. The pitching actuator 316 can include a linear actuator comprising the rod 326 disposed within the cylinder 324 and configured to extend and retract relative to the cylinder 324, wherein the rod 326 is coupled to the clamping ring 328. At block 1200, the operation of actuating the pitching actuator includes extending or retracting the rod 326 to cause the clamping ring 328 and the transmission 302 coupled to the upper frame 102 to tilt about the first axis (z-axis).

Figure 13:
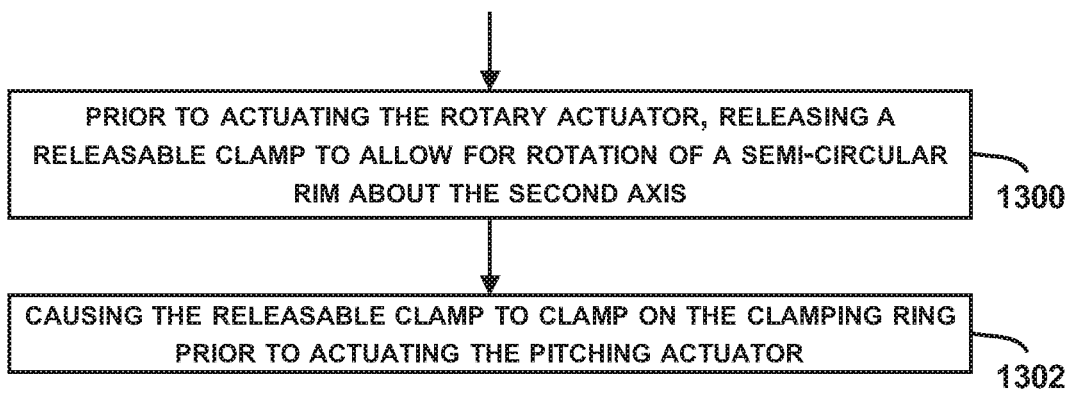
FIG. 13 is a flowchart of additional operations that may be executed and performed with the method of FIG. 11, in accordance with an example implementation.

FIG. 13 is a flowchart of additional operations that may be executed and performed with the method 1100, in accordance with an example implementation. As described above, the clamping ring 328 can comprise a semi-circular rim, wherein the pitching actuator 316 is releasably coupled to the semi-circular rim via the releasable clamp 334. At block 1300, operations include, prior to actuating the rotary actuator 128, releasing the releasable clamp 334 to allow for rotation of the semi-circular rim about the second axis (y-axis). At block 1302, operations include causing the releasable clamp 334 to clamp on the clamping ring 328 prior to actuating the pitching actuator 316.

Figure 14:
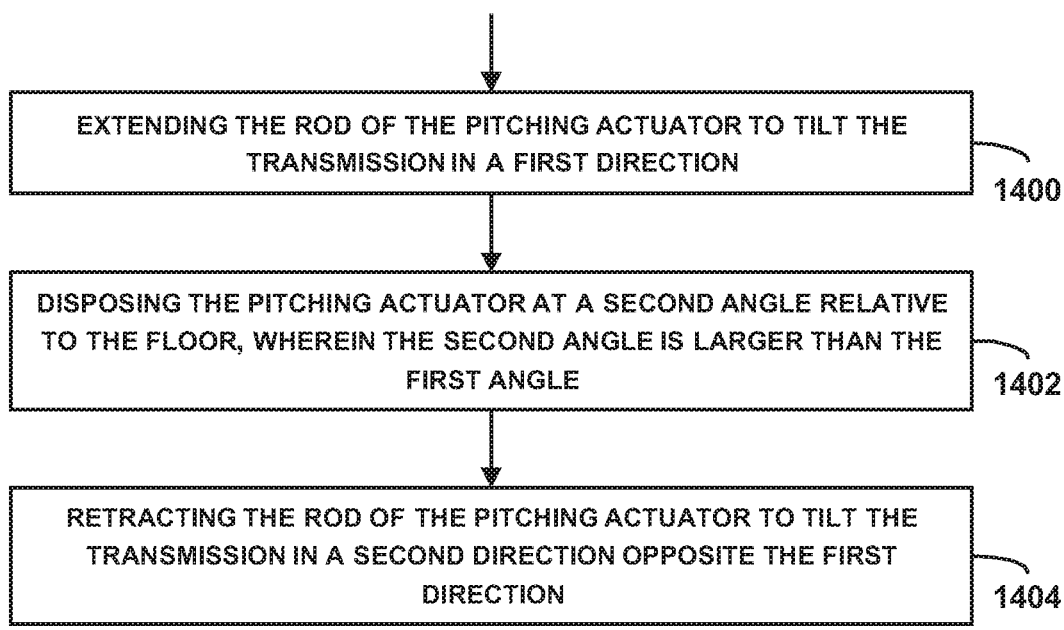
FIG. 14 is a flowchart of additional operations that may be executed and performed with the method of FIG. 11, in accordance with an example implementation.

FIG. 14 is a flowchart of additional operations that may be executed and performed with the method 1100, in accordance with an example implementation. As described above, the pitching actuator 316 can be disposed at a first angle relative to the floor 119 on which the test fixture 100 is mounted. The operation of actuating the pitching actuator comprises: at block 1400, extending the rod 326 of the pitching actuator 316 to tilt the transmission 302 in a first direction (e.g., positive pitch angles); at block 1402, disposing the pitching actuator 316 at a second angle relative to the floor 119, wherein the second angle is larger than the first angle; and at block 1404, retracting the rod 326 of the pitching actuator 316 to tilt the transmission 302 in a second direction (e.g., negative pitch angles) opposite the first direction.

Figure 15:
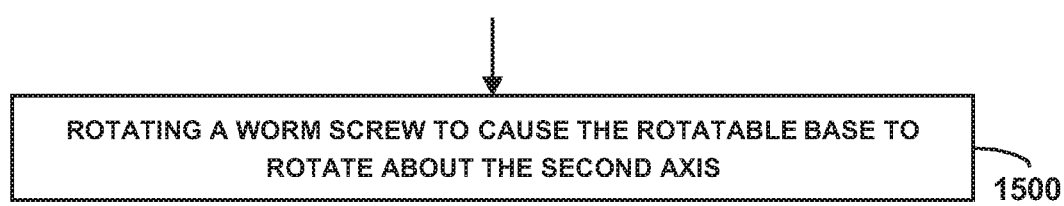
FIG. 15 is a flowchart of additional operations that may be executed and performed with the method of FIG. 11, in accordance with an example implementation.

FIG. 15 is a flowchart of additional operations that may be executed and performed with the method 1100, in accordance with an example implementation. As described above, in examples, the rotary actuator 128 can include the worm gear 208 fixedly coupled to the lower frame 114 and the worm screw 206 fixedly mounted to the rotatable base 126, wherein the worm screw 206 is configured to engage teeth of the worm gear 208. At block 1500, the operation of actuating the rotary actuator 128 includes rotating the worm screw 206 to cause the rotatable base 126 to rotate about the second axis (the y-axis).

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A test fixture comprising:
a lower frame having a first rocker rail and a second rocker rail coupled to the first rocker rail, wherein each of the first rocker rail and the second rocker rail has a respective curved surface that allows the lower frame to tilt about a first axis;
a rotatable base coupled to the lower frame;
an upper frame having a mounting system configured to couple a transmission of an aircraft to the upper frame;
a support frame that couples the upper frame to the rotatable base; and
a rotary actuator configured to rotate the rotatable base, the support frame, and the upper frame about a second axis perpendicular to the first axis.

2. The test fixture of claim 1, wherein the mounting system of the upper frame includes one or more struts configured to be coupled to the transmission of the aircraft, and one or more mounting plates configured to mount (i) a drive motor configured to drive the transmission, and (ii) a cooling system configured to cool lubrication fluid of the transmission.

3. The test fixture of claim 1, wherein the first rocker rail is parallel to the second rocker rail, and wherein the lower frame further includes a central portion disposed between the first rocker rail and the second rocker rail, and wherein the rotatable base is rotatably coupled to the central portion via a slew bearing.

4. The test fixture of claim 1, wherein the rotary actuator includes a worm gear fixedly coupled to the lower frame and a worm screw fixedly mounted to the rotatable base, wherein the worm screw is configured to engage teeth of the worm gear, such that rotation of the worm screw causes the rotatable base to rotate about the second axis.

5. The test fixture of claim 1, further comprising:
one or more counterweights coupled to the upper frame and configured to balance a load imposed on the upper frame when the transmission is mounted to the upper frame.

6. A testing system comprising:
a test fixture comprising:
a lower frame having a first rocker rail and a second rocker rail coupled to the first rocker rail, wherein each of the first rocker rail and the second rocker rail has a respective curved surface that allows the lower frame to tilt about a first axis,
a rotatable base coupled to the lower frame,
an upper frame having a mounting system configured to couple a transmission of an aircraft to the upper frame,
a support frame that couples the upper frame to the rotatable base, and
a rotary actuator configured to rotate the rotatable base, the support frame, and the upper frame about a second axis perpendicular to the first axis;
a clamping ring coupled to the upper frame and configured to be coupled to the transmission; and
a pitching actuator coupled to the clamping ring, wherein actuation of the pitching actuator causes the clamping ring and the upper frame to tilt about the first axis, such that when the transmission is mounted to the clamping ring and the upper frame, actuation of the pitching actuator causes the transmission to be disposed at a particular pitch angle relative to the first axis.

7. The testing system of claim 6, wherein the pitching actuator is a linear actuator comprising a rod disposed within a cylinder and configured to extend and retract relative to the cylinder, such that extension and retraction of the rod cause the clamping ring and the transmission coupled to the upper frame to tilt about the first axis.

8. The testing system of claim 6, wherein the clamping ring comprises a semi-circular rim, wherein the pitching actuator is releasably coupled to the semi-circular rim via a releasable clamp to allow for rotation of the semi-circular rim about the second axis when the releasable clamp is released.

9. The testing system of claim 6, further comprising:
a drive motor coupled to the upper frame and configured to drive the transmission; and
a cooling system coupled to the upper frame and configured to cool lubrication fluid of the transmission.

10. The testing system of claim 9, wherein the mounting system of the upper frame includes one or more struts configured to be coupled to the transmission of the aircraft, and one or more mounting plates configured to mount the drive motor and the cooling system to the upper frame.

11. The testing system of claim 6, wherein the first rocker rail is parallel to the second rocker rail, and wherein the lower frame further includes a central portion disposed between the first rocker rail and the second rocker rail, and wherein the rotatable base is rotatably coupled to the central portion via a slew bearing.

12. The testing system of claim 6, wherein the rotary actuator includes a worm gear fixedly coupled to the lower frame and a worm screw fixedly mounted to the rotatable base, wherein the worm screw is configured to engage teeth of the worm gear, such that rotation of the worm screw causes the rotatable base to rotate about the second axis.

13. The testing system of claim 6, further comprising:
one or more counterweights coupled to the upper frame and configured to balance a load imposed on the upper frame when the transmission is mounted to the upper frame.

14. The testing system of claim 6, wherein the mounting system is a first mounting system, wherein a first end of the pitching actuator is coupled to the clamping ring, and wherein the testing system further comprises:
a second mounting system coupled a floor on which the test fixture is mounted, wherein a second end of the pitching actuator is supported via the second mounted system.

15. The testing system of claim 14, wherein the pitching actuator is configured to be mounted to the second mounting system at a first angle relative to the floor to tilt the upper frame in a first direction, and is configured to be mounted to the second mounting system at a second angle relative to the floor to tilt the upper frame in a second direction opposite the first direction, wherein the second angle is larger than the first angle.

16. A method comprising:
mounting a transmission of an aircraft to a test fixture, wherein the test fixture comprises: (i) a lower frame having a first rocker rail and a second rocker rail coupled to the first rocker rail, wherein each of the first rocker rail and the second rocker rail has a respective curved surface that allows the lower frame to tilt about a first axis, (ii) a rotatable base coupled to the lower frame, (iii) an upper frame having a mounting system configured to couple the transmission to the upper frame, (iv) a support frame that couples the upper frame to the rotatable base, and (v) a rotary actuator configured to rotate the rotatable base, the support frame, and the upper frame about a second axis perpendicular to the first axis;
driving the transmission at a first speed for a first period of time while recording temperature and pressure of lubrication fluid circulating through the transmission;
actuating a pitching actuator coupled to the transmission to tilt the transmission about the first axis;
after actuating the pitching actuator, driving the transmission at a second speed for a second period of time while recording temperature and pressure of lubrication fluid circulating through the transmission;
actuating the rotary actuator to rotate the transmission about the second axis;
after actuating the rotary actuator, actuating the pitching actuator coupled to the transmission to tilt the transmission about the first axis; and
after actuating the rotary actuator and the pitching actuator, driving the transmission at a third speed for a third period of time while recording temperature and pressure of lubrication fluid circulating through the transmission.

17. The method of claim 16, wherein a clamping ring is coupled to the upper frame and configured to be coupled to the transmission, wherein the pitching actuator is a linear actuator comprising a rod disposed within a cylinder and configured to extend and retract relative to the cylinder, wherein the rod is coupled to the clamping ring, and wherein actuating the pitching actuator comprises:
extending or retracting the rod to cause the clamping ring and the transmission coupled to the upper frame to tilt about the first axis.

18. The method of claim 17, wherein the clamping ring comprises a semi-circular rim, wherein the pitching actuator is releasably coupled to the semi-circular rim via a releasable clamp, wherein the method further comprises:
- prior to actuating the rotary actuator, releasing the releasable clamp to allow for rotation of the semi-circular rim about the second axis; and
- causing the releasable clamp to clamp on the clamping ring prior to actuating the pitching actuator.

19. The method of claim 17, wherein the pitching actuator is disposed at a first angle relative to a floor on which the test fixture is mounted, and wherein actuating the pitching actuator comprises:
- extending the rod of the pitching actuator to tilt the transmission in a first direction;
- disposing the pitching actuator at a second angle relative to the floor, wherein the second angle is larger than the first angle; and
- retracting the rod of the pitching actuator to tilt the transmission in a second direction opposite the first direction.

20. The method of claim 16, wherein the rotary actuator includes a worm gear fixedly coupled to the lower frame and a worm screw fixedly mounted to the rotatable base, wherein the worm screw is configured to engage teeth of the worm gear, and wherein actuating the rotary actuator comprises:
- rotating the worm screw to cause the rotatable base to rotate about the second axis.

\* \* \* \* \*